United States Patent [19]

Halpaap et al.

[11] Patent Number: 5,126,422
[45] Date of Patent: Jun. 30, 1992

[54] COATING COMPOSITIONS AND COATED HEAT-RESISTANT SUBSTRATES PREPARED THEREFROM

[75] Inventors: Reinhard Halpaap, Odenthal-Gloebusch; Willi Dünwald, Leverkusen; Holger Casselmann, Bergisch-Gladbach; Hans Schlegel, Leverkusen, all of Fed. Rep. of Germany

[73] Assignee: Bayer Aktiengesellschaft, Leverkusen, Fed. Rep. of Germany

[21] Appl. No.: 713,238

[22] Filed: Jun. 7, 1991

[30] Foreign Application Priority Data

Jun. 14, 1990 [DE] Fed. Rep. of Germany ....... 4019026

[51] Int. Cl.$^5$ .............................................. C08G 18/80
[52] U.S. Cl. ...................... 528/45; 428/425.8
[58] Field of Search ................... 528/45; 428/425.8

[56] References Cited

U.S. PATENT DOCUMENTS

| | | | |
|---|---|---|---|
| 3,397,253 | 8/1968 | Merten et al. | 260/830 |
| 3,931,131 | 1/1976 | Noziri et al. | 260/91.7 |
| 4,088,637 | 5/1978 | Zecher et al. | 528/45 |
| 4,100,144 | 7/1978 | Dünwald et al. | 260/360 |
| 4,431,758 | 2/1984 | Osada et al. | 524/104 |
| 4,444,845 | 4/1984 | Dünwald | 428/422.8 |
| 4,740,576 | 4/1988 | Reiter et al. | 528/45 |
| 4,853,261 | 8/1989 | Dünwald et al. | 427/388 |
| 4,954,577 | 9/1990 | Dünwald et al. | 525/420 |

FOREIGN PATENT DOCUMENTS

| | | |
|---|---|---|
| 231509 | 8/1987 | European Pat. Off. . |
| 1170096 | 5/1964 | Fed. Rep. of Germany . |
| 3817614 | 8/1989 | Fed. Rep. of Germany . |
| 1195886 | 6/1970 | United Kingdom . |

OTHER PUBLICATIONS

International Winding Wire Standars-Progress Towards Harmonization, S. Darling in "Proceeding 19th EEI Conference", Chicago 25th to 28th Sep. 1989, pp. 56.

*Primary Examiner*—Maurice J. Welsh
*Attorney, Agent, or Firm*—Joseph C. Gil; Thomas W. Roy

[57] ABSTRACT

The present invention relates to coating compositions which are suitable for the production of heat resistant films and coatings and contain
  a) 100 parts by weight of organic compounds having
     (i) carbodiimide and/or uretoneimine groups and
     (ii) blocked isocyanate groups,
  b) 2 to 100 parts by weight of intramolecular carboxylic acid anhydrides which have a molecular weight of 98 to 500 and may contain free carboxyl groups and
  c) 2 to 100 parts by weight of polyhydric alcohols which have a molecular weight of 62 to 400 and a hydroxyl functionality of 2 to 4.

The present invention also relates to heat-resistant substrates, in particular for wires, coated with these coating compositions.

16 Claims, No Drawings

COATING COMPOSITIONS AND COATED HEAT-RESISTANT SUBSTRATES PREPARED THEREFROM

BACKGROUND OF THE INVENTION

1. Field of the Invention

The present invention relates to a new coating composition for heat-resistant substrates, in particular for coating wires, which enables exceptionally heat resistant lacquer coats to be produced and enables the coated wires to be tinned or soldered at temperatures of 370° C. or above, and to the coated heat-resistant substrates, in particular coated wires, prepared therefrom.

2. Description of the Prior Art

It has been known for many years to produce coated wires capable of being tinned at comparatively low temperatures of about 375° to 390° C. by using wire coatings based on polyurethanes. The binders of the wire coatings used for this purpose are based on combinations of polyester polyols and phenol-blocked or alkanol-blocked polyisocyanates (DE-AS 1,170,096 or DE-AS 2,626,175). An improvement in the solderability of the coatings may be obtained by incorporating a larger number of urethane groups in the polymer film by combining blocked polyisocyanates with hydroxy functional oligourethanes (DE-OS 1,644,794).

Polyurethane wire coatings based on the above-mentioned combinations are widely used for the production of coated copper wires which are readily tinned; however, due to the fact that they only possess moderate temperature resistance (temperature index TI according to IEC 172=130° to 155° C., IEC=International Electrotechnical Commission), they can only be used to a limited extent. The heat classes or temperature indices of the insulating materials for coated wires are listed, for example, in "International Wire Standards-Progress Towards Harmonization" by S. Darling, in "Proceedings 19th EEI Conference", Chicago, 25th to 28th September 1989, page 56.

It is also known to coat metal wires with coatings which are much more resistant to prolonged exposure to heat (temperature index TI according to IEC 172 of about 18° C.). These wire coatings are not based on polyurethanes but on heat resistant synthetic resins such as polyhydantoin (e.g., FR-PS 1,484,694 and DE-PS 2,460,206), polyamidimides (e.g., DE-OS 3,544,548, DE-OS 3,714,033 and DE-OS 3,817,614) and polyester amidimides (e.g., U.S. Pat. No. 3,652,471 and DE-PS 3,249,497). However, no wires which have been coated with wire coatings based on these synthetic resins can be tinned at temperatures below 400° C.

Although polyester imides having a temperature index TI of 180° C. are described as solderable (capable of being soldered or tinned) in the above mentioned publication by S. Darling, this tinning according to IEC 851 is said to be possible only at temperatures above 400° C. The requirements to be met by the various types of coated wires are described in IEC 317 in which, for example, the tinning temperature for tinnable polyester imides having a temperature index of 180° C. (IEC 317, Part 23) is stated to be 470° C.

Polyisocyanates containing carbodiimide and/or uretoneimine groups and their use for coating wires are disclosed in EP-B-231,509. These polyisocyanates are suitable for the production of coated wires which can be soldered (Example 1 of EP-B-231,509) or for the production of heat resistant coated wires (Example 3 of EP-B-231,509), depending upon the reaction components.

Coating binders containing mixtures of very special polyamidoimides based on trimellitic acid anhydride and the above-mentioned special blocked polyisocyanates described in EP-B-231,509 are also known; according to EP-A-291,699, these binders give rise to highly heat resistant films.

The use of low molecular weight additives in binder systems based on blocked isocyanates for improving their technological properties is also known. Heat-resistant coated wires are obtained according to EP-A-287,947 by using unsaturated carboxylic acids in combination with polyisocyanates containing carbodiimide and/or uretoneimine groups. The use of N,N',N"-tris-(2-hydroxyethyl)-isocyanurate as an additive for wire coatings based on polyurethanes also results in heat-resistant coated wires (DE-OS 3,133,571).

In summary, the teachings according to the known state of the art are limited to coating wires either with wire coatings which result in highly heat-resistant coatings (temperature index TI above 180° C.) or with systems which are capable of producing coated wires which can be tinned at a comparatively low temperature (about 370° C.).

Therefore, it is an object of the present invention to provide a coating composition for heat-resistant substrates, in particular for wire coatings, which combines the two advantages (high heat resistance and tinning at comparatively low temperatures). Wires coated with the coating compositions according to the present invention should, in particular, be capable of being tinned at about 370° C. according to IEC 851 and should at the same time have a temperature index TI according to IEC 172 of at least 180° C. The other properties should to the extent possible correspond to those of known wire coatings and wires coated with such wire coatings.

It was surprisingly found that these objectives may be achieved with the coating compositions of the present invention. The invention was based on the surprising observation that the use of individual components a), b) and c) as binders was suitable for achieving the objectives stated above.

SUMMARY OF THE INVENTION

The present invention relates to coating compositions which are suitable for the production of heat resistant films and coatings and contain
a) 100 parts by weight of organic compounds having
   (i) carbodiimide and/or uretoneimine groups and
   (ii) blocked isocyanate groups,
b) 2 to 100 parts by weight of intramolecular carboxylic acid anhydrides which have a molecular weight of 98 to 500 and may contain free carboxyl groups and
c) 2 to 100 parts by weight of polyhydric alcohols which have a molecular weight of 62 to 400 and a hydroxyl functionality of 2 to 4.

The present invention also relates to heat-resistant substrates, in particular for wires, coated with these coating compositions.

DETAILED DESCRIPTION OF THE INVENTION

Component a) of the coating compositions according to the invention includes compounds containing (i) carbodiimide and/or uretoneimine groups and (ii)

blocked isocyanate groups. The proportion of carbodiimide groups (calculated as N=C=N) is 0 to 25% by weight, preferably 1 to 20% by weight; the proportion of uretoneimine groups (calculated as $C_2N_3O$) is 0 to 30% by weight, preferably 0 to 25% by weight; the sum of carbodiimide and uretoneimine groups (calculated as N=C=N) is 0.5 to 25% by weight, preferably 1 to 20% by weight; and the proportion of blocked isocyanate groups (calculated as NCO) is 1 to 25% by weight, preferably 5 to 22% by weight, wherein all of the percentages are based on the weight of component a).

The preparation of these compounds may be carried out by blocking 10 to 90%, preferably 20 to 80%, more preferably 30 to 70% of the isocyanate groups of an organic polyisocyanate by a reaction with a monofunctional blocking agent for isocyanate groups and then converting 65 to 100% of the remaining free isocyanate groups into carbodiimide groups with elimination of carbon dioxide. The uretoneimine groups which may be present result from the chemical addition of any remaining free isocyanate groups to the carbodiimide groups formed in the reaction. The preparation of these compounds has been described in detail in EP-B-231,509 (U.S. Ser. No. 07/351,683, herein incorporated by reference), and the embodiments and starting materials mentioned therein as preferred are also preferred for the present invention.

Component b) includes any intramolecular carboxylic acid anhydrides having a molecular weight of 98 to 500 and optionally containing free carboxyl groups in addition to the anhydride groups. Component b) preferably includes tricarboxylic acid anhydrides such as trimellitic acid anhydride, naphthalene tricarboxylic acid anhydride, 3,3',4-benzophenone tricarboxylic acid anhydride, propane tricarboxylic acid anhydride and butane-1,2,4-tricarboxylic acid anhydride. The aromatic tricarboxylic acid anhydrides are especially preferred, in particular trimellitic acid anhydride.

Tetracarboxylic acid dianhydrides and dicarboxylic acid anhydrides are also suitable, but less preferred. Examples of these anhydrides include pyromellitic acid anhydride, naphthalene tetracarboxylic acid dianhydride, benzophenone tetracarboxylic acid dianhydride, butane tetracarboxylic acid dianhydride, phthalic acid anhydride, maleic acid anhydride and succinic acid anhydride. These tetracarboxylic acid dianhydrides and dicarboxylic acid anhydrides, of which the aromatic compounds are preferred, are generally used in only minor quantities, if at all, in addition to the preferred tricarboxylic acid anhydrides, i.e., in quantities of less than 50% by weight, preferably less than 30% by weight, based on the total weight of component b).

Component c) includes polyhydric alcohols or mixtures of polyhydric alcohols having 2 to 4, preferably 3 hydroxyl groups per molecule and a molecular weight of 62 to 400, preferably 92 to 300. Suitable examples of polyhydric alcohols are disclosed in EP-B 231 509, page 4, lines 27 to 32 (U.S. Ser. No. 07/351,683, herein incorporated by reference). Glycerol, trimethylolpropane, N,N'N"-tris-(2-hydroxyethyl)-iscyanurate and mixtures of these trihydric alcohols are particularly preferred.

The individual components a), b) and c) are present in the coating compositions according to the invention in quantities of 2 to 100 parts by weight, preferably from 5 to 40 parts by weight of component b) and 2 to 100 parts by weight, preferably from 10 to 80 parts by weight of component c) for every 100 parts by weight of component a), provided that the sum of components b) and c) is 5 to 150 parts by weight, preferably from 15 to 100 parts by weight, per 100 parts by weight of component a).

Further, the binders contain the individual components a), b), c) and, if used, the additives d) with free carboxyl groups mentioned below in such proportions that the ratio of equivalents A of component a) to the equivalents B of the isocyanate reactive and/or carbodiimide reactive groups of components b), c) and optionally d) is 0.1:1 to 10:1, preferably 0.2:1 to 5:1, and more preferably 0.4:1 to 2:1. The equivalents of A are the sum of equivalents of blocked isocyanate groups, carbodiimide groups and uretoneimine groups, wherein the blocked isocyanate groups and carbodiimide groups are counted as monofunctional groups and the uretoneimine groups are counted as difunctional groups. The equivalents of B are the sum of the carboxyl and carboxylic acid anhydride equivalents of component b) and optionally d) and the hydroxyl equivalents of component c).

The carboxyl and carboxylic acid anhydride equivalents contained in the equivalents B are present in an equivalent ratio to the hydroxyl equivalents present in component c) of 0.1:1 to 2:1, preferably 0.2:1 to 1:1.

The coating compositions according to the invention contain either the binder components a), b) and c) or a composition containing this binder combination and also auxiliary agents and additives d). The coating compositions ready-for-use preferably consist of solutions of the binder combination of the individual components a), b) and c) in solvents of the type mentioned below although other auxiliary agents and additives d) may be used in addition to solvents.

The following are examples of suitable auxiliary agents and additives d):

Dicarboxylic acids having a molecular weight range of 118 to 300 such as succinic acid, adipic acid, azelaic acid, terephthalic acid, isophthalic acid and 2,6-naphthalene dicarboxylic acid. Aromatic dicarboxylic acids are preferred to aliphatic dicarboxylic acids. Such free dicarboxylic acids are used, if at all, in quantities of up to 50% by weight, preferably up to 30% by weight, based on the weight of component b).

Solvents, including known coatings solvents such as ethyl acetate, butyl acetate, ethylene glycol monomethyl and monoethyl ether acetate, 1-methoxypropyl-2-acetate, 2-butanone, 4-methyl-2-pentanone, cyclohexanone, toluene, xylene, solvent naphtha and mixtures thereof. Particularly suitable are those solvents which are generally used in wire coating processes, e.g., phenolic solvents such as phenol, cresol and/or xylenol as well as N-methylpyrrolidone and/or N-methylcaprolactam. Plasticizers may also be used as solvents but are less preferred for this purpose, e.g., plasticizers based on phosphoric, sulphonic or phthalic acid esters. The solutions of binder combination for the preferred wire coatings according to the invention are generally used at concentrations of 15 to 75% by weight, preferably 20 to 60% by weight. The ready-for-use wire coatings therefore generally have a solvent content of 25 to 85% by weight, preferably 40 to 80% by weight, based on the total weight of the wire coating.

Catalysts which are known from polyurethane chemistry and described, for example, in Kunststoff-Handbuch (Publishers Becker/Braun), Vol.7, Polyurethane, pages 92 et seq, Carl Hanser Verlag, Munich, Vienna 1983. The catalysts described in DE-AS 2 626 175, at column 7, line 35 to column 8, line 27 (U.S. Pat. No. 4,100,144, herein incorporated by reference) are also suitable. Organic metal catalysts are particularly suitable, preferably organic titanium, zinc or tin compounds such as tetraisopropyl titanate, zinc octoate, dibutyl tin oxide and dibutyl tin dilaurate. Reaction products of amines with carbonyl compounds are also suitable, e.g., aldimines based on aliphatic aldehydes such as butyraldehyde and aromatic amines such as aniline. The catalysts are used, if at all, in quantities of 0.01 to 5.0% by weight, preferably 0.1 to 3.0% by weight, based on the binder mixtures according to the invention. In many cases, however, the temperatures prevailing in the usual stoving channels for wire coatings are sufficient to ensure that the reaction, i.e., curing of the coatings, will take place within a sufficiently short period of time without the addition of a catalyst.

Oligomeric or polymeric compounds which have previously been used for wire coatings. The addition of such other binder components is, however, less preferred.

Pigments such as titanium dioxide.

The coating compositions according to the invention are stable in storage at room temperature or moderately elevated temperatures (up to about 50° C.) and react when heated to temperatures above 80° C., preferably 100° to 500° C. and more preferably 180° to 400° C., to yield cross-linked synthetic resins with concurrent evaporation of any volatile constituents present such as solvents.

The binders according to the invention are suitable as stoving compositions for coating any heat resistant substrates such as metals, ceramics, glass fibers and fabrics, preferably metal wires. The binder compositions according to the invention, optionally mixed with auxiliary agents and additives of the type mentioned above, may be applied to the substrates by methods known from coating technology and the coatings applied are then cured at the temperature ranges mentioned above.

In the preferred coating of wires, the wires are coated by the known immersion, roller application or suction felt processes and are then dried, i.e., the coatings are cured in conventional drying ovens within the above-mentioned temperature ranges.

When the binders according to the invention are used for coating wires, the excellent adherence to the wire, very good flexibility, high values for abrasion resistance and heat shock, softening temperature, dielectric loss factor and good solvent resistance should be particularly noted.

The percentages given in the following examples are all percentages by weight, unless otherwise noted. The quantities of blocked isocyanate groups are calculated as "NCO", i.e., on the basis of a molecular weight of 42, and the quantities of NCN groups are calculated on the basis of a molecular weight of 40.

EXAMPLES

Preparation of blocked polyisocyanate solution I containing carbodiimide groups (according to EP-B 231,509, U.S. Ser. No. 07/351,683):

2161 g of cresol (commercial isomeric mixture) were added within about 30 minutes, starting at 80° C., to a mixture of 174 g of 2,4-diisocyanatotoluene and 2,6-diisocyanatotoluene (ratio by weight 8:2) and 250 g of 4,4'-diisocyanatodiphenylmethane and the temperature was maintained at 120° C. for 6 hours. When an isocyanate content of 13.0% was reached (theoretical NCO - 13.1%), the reaction mixture was diluted with 256 g of 1-methoxypropyl-2-acetate.

Carbodiimide formation was catalyzed by the addition of 2.0 g of a commercial mixture of 1-methyl-1-phospha-2-cyclopent-1-oxide and 1-methyl-1-phospha-3-cyclopent-1-oxide at 60° C. 22 1 of $CO_2$ were liberated at the end of about 15 hours (about 92% of the theoretical amount).

A solution of a blocked polyisocyanate having the following characteristics was obtained:

| | |
|---|---|
| Concentration: | about 70% by weight |
| Viscosity (23° C.) | 28000 mPa · s |
| Blocked NCO content (calculated): | 9.9% |
| NCN content (calculated): | 4.7% |

EXAMPLE 1

359 parts by weight of polyisocyanate solution I were mixed with 542.2 parts by weight of N-methyl-pyrrolidone. 40.5 parts by weight of trimellitic acid anhydride and 58.3 parts by weight of N,N',N"-tris-(2-hydroxyethyl)-isocyanurate were then added. 3.5 parts by weight of an aldimine of aniline and butyraldehyde were added to the resulting solution as catalyst.

Solids content: 35%

Outflow time (4 mm DIN cup): 30 s

The outflow time was unchanged after storage for 3 months at room temperature.

Use:

A copper wire 0.3 mm in diameter was coated by means of a nozzle stripper in 7 passages (nozzle gradation 0.33 to 0.39 mm; step 0.01 mm) through a vertical circulating air wire coating plant of MAG, Graz-/Austria, Model VE5, an oven temperature of 400° C. being employed and the wire being passed through at the rate of 90 m/min.

The coated wire can be tinned within 6 seconds at 370° C. (IEC 851), the tan$\delta$ kink point (IEC 851, Part 5; Test 19) was 200° C. and the softening temperature according to IEC 851, Part 6; 4.1.2 was 260° C. The coating was highly flexible. After 20% prestretching, the wire was wound around a cylindrical mandrel of 0.3 mm without forming any cracks in the coating. The coated wire had a temperature index (IEC 172) of 180° C.

EXAMPLE 2

307 parts by weight of polyisocyanate solution I were mixed with 456 parts by weight of cresol and 152 parts by weight of xylene. 35 parts by weight of trimellitic acid anhydride and 50 parts by weight of N,N',N"-tris-(2-hydroxy-ethyl)-isocyanurate were then added. 3 parts by weight of an aldimine of aniline and butyraldehyde were added as catalyst to the resulting solution.

The coating was suitable for application with nozzles.

Solids content 30%

Outflow time (4 mm DIN cup): 130 s

The outflow time was unchanged after storage for 3 months at room temperature.

EXAMPLE 3

307 parts by weight of polyisocyanate solution I were mixed with 405.3 parts by weight of N-methyl-pyrrolidone and 202.7 parts by weight of cyclohexanone, and then 35 parts by weight of N,N',N"-tris-(2-hydroxyethyl)-isocyanurate were added. 3 parts by weight of an aldimine of aniline and butyraldehyde were added as catalyst to the resulting solution. The coating was suitable for application with a felt stripper.
Solids content 30%
Outflow time (4 mm DIN CUP): 30 s
The outflow time was unchanged after storage for 3 months at room temperature.

EXAMPLE 4

295.3 parts by weight of polyisocyanate solution I were mixed with 152.9 parts by weight of N-methyl-pyrrolidone and 458.5 parts by weight of cyclohexanone. 33.3 parts by weight of trimellitic acid anhydride and 60 parts by weight of N,N',N"-tris-(2-hydroxyethyl)-isocyanurate were then added. 3 parts by weight of zinc octoate (8% Zn) were added as catalyst to the resulting solution.
Solids content 30%
Outflow time (4 mm DIN cup): 25 s
Use:

A copper wire 0.7 mm in diameter was coated by means of a felt stripper in 6 passages through a vertical wire coating unit having an oven length of 4 m. The process resulted in an increase in diameter of 45 to 50 μm. When the oven temperature was 400° C., the speed of coating was varied from 10 to 22 m/min without the coating showing any cracks when the wire was stretched to breaking point. When a coating speed of 14 m/min was employed, the coated wire can be tinned within 6 seconds at 370° C. (according to IEC 851). The heat shock (IEC 851, Part 6; 3.1) was higher than 260° C. The coated wire had a temperature index (IEC 172) of 180° C.

EXAMPLE 5

246 parts by weight of polyisocyanate solution I were mixed with 313 parts by weight of cyclohexanone and 313 parts by weight of N-methyl-pyrrolidone. 28 parts by weight of trimellitic acid anhydride and 100 parts by weight of N,N',N"-tris-(2-hydroxyethyl)-isocyanurate were then added. 3 parts by weight of an aldimine of aniline and butyraldehyde were added as catalyst to the resulting solution.
Solids content 30%
Outflow time (4 mm DIN cup): 16 s
The outflow time was unchanged after storage for 3 months at room temperature.
Use:

A copper wire 0.7 mm in diameter was coated by means of a felt stripper in 6 passages through a vertical wire coating unit having an oven length of 4 m. The diameter of the wire was increased by 45 to 55 μm. At an oven temperature of 400° C., the speed of coating was varied from 10 to 20 m/min without the coating showing any cracks when the wire was stretched to breaking point. At a coating speed of 14 m/min, the coated wire may be tinned within 4 seconds at 370° C. (IEC 851). The tanδ kink point (IEC 851, Part 5, Test 19) was 180° C.

Although the invention has been described in detail in the foregoing for the purpose of illustration, it is to be understood that such detail is solely for that purpose and that variations can be made therein by those skilled in the art without departing from the spirit and scope of the invention except as it may be limited by the claims.

What is claimed is:

1. A coating composition which is suitable for the production of heat resistant films and coatings and comprises
   a) 100 parts by weight of an organic compound containing (i) carbodiimide and/or uretoneimine groups and (ii) blocked isocyanate groups,
   b) 2 to 100 parts by weight of an intramolecular carboxylic acid anhydride which has a molecular weight of 98 to 500 and may contain free carboxyl groups and
   c) 2 to 100 parts by weight of a polyhydric alcohol which has a molecular weight of 62 to 400 and a hydroxyl functionality of 2 to 4.

2. The coating composition of claim 1 wherein component a) contains
   i) 0 to 25% by weight of carbodiimide groups (calculated as NCN),
   ii) 0 to 30% by weight of uretoneimine groups (calculated as $C_2N_3O$) and
   iii) 1 to 25% by weight of blocked isocyanate groups (calculated as NCO), and
   iv) the sum of carbodiimide groups and uretoneimine groups (calculated as NCN) is 0.5 to 25% by weight.

3. The coating composition of claim 1 wherein component c) comprises a member selected from the group consisting of glycerol, trimethylolpropane and N,N',N"-tris-(2-hydroxyethyl)-isocyanurate.

4. The coating composition of claim 2 wherein component c) comprises a member selected from the group consisting of glycerol, trimethylolpropane and N,N',N"-tris-(2-hydroxyethyl)-isocyanurate.

5. The coating composition of claim 1 wherein component b) comprises a tricarboxylic acid monoanhydride.

6. The coating composition of claim 2 wherein component b) comprises a tricarboxylic acid monoanhydride.

7. The coating composition of claim 3 wherein component b) comprises a tricarboxylic acid monoanhydride.

8. The coating composition of claim 4 wherein component b) comprises a tricarboxylic acid monoanhydride.

9. The coating composition of claim 1 wherein component b) comprises trimellitic acid anhydride.

10. The coating composition of claim 2 wherein component b) comprises trimellitic acid anhydride.

11. The coating composition of claim 3 wherein component b) comprises trimellitic acid anhydride.

12. The coating composition of claim 4 wherein component b) comprises trimellitic acid anhydride.

13. A coated heat resistant substrate wherein the coating comprises the coating composition of claim 1.

14. The coated heat resistant substrate of claim 13 wherein the substrate is a wire.

15. A coated heat resistant substrate wherein the coating comprises the coating composition of claim 12.

16. The coated heat resistant substrate of claim 15 wherein the substrate is a wire.

* * * * *